(12) United States Patent
Hayashi

(10) Patent No.: US 8,819,614 B2
(45) Date of Patent: Aug. 26, 2014

(54) ESD ANALYSIS APPARATUS

(71) Applicant: Kabushiki Kaisha Toshiba, Tokyo (JP)

(72) Inventor: Sachio Hayashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/760,943

(22) Filed: Feb. 6, 2013

(65) Prior Publication Data

US 2014/0013296 A1 Jan. 9, 2014

(30) Foreign Application Priority Data

Jul. 4, 2012 (JP) ................................. 2012-150315

(51) Int. Cl.
*G06F 17/50* (2006.01)
(52) U.S. Cl.
USPC ........................................................ 716/136
(58) Field of Classification Search
USPC ........................................................ 716/136
See application file for complete search history.

(56) References Cited

U.S. PATENT DOCUMENTS

| 7,302,378 | B2 | 11/2007 | Hayashi |
| 7,340,699 | B2 | 3/2008 | Hayashi |
| 7,512,916 | B2 * | 3/2009 | Hayashi ........................ 716/136 |
| 2004/0251983 | A1 * | 12/2004 | Hsu et al. ........................ 333/32 |
| 2005/0005253 | A1 * | 1/2005 | Strickland et al. ................ 716/5 |
| 2005/0146380 | A1 * | 7/2005 | Hayashi ........................ 330/149 |
| 2011/0022376 | A1 * | 1/2011 | Kobayashi et al. ............. 703/14 |

FOREIGN PATENT DOCUMENTS

| JP | 2005-093802 A | 4/2005 |
| JP | 2005-196468 A | 7/2005 |
| JP | 2006-107250 A | 4/2006 |

\* cited by examiner

*Primary Examiner* — Vuthe Siek
*Assistant Examiner* — Mohammed Alam
(74) *Attorney, Agent, or Firm* — Knobbe, Martens, Olson & Bear LLP

(57) ABSTRACT

According to one embodiment, a chip model generating unit and a counter tester ground capacitance adding unit are provided. The chip model generating unit generates a chip model based on an ESD protection circuit network model to which an inter power net capacitance of a semiconductor chip is added. The counter tester ground capacitance adding unit adds a counter tester ground capacitance to the chip model.

17 Claims, 19 Drawing Sheets

| INTERCONNECTION LAYER | M1 | M2 | M3 | M4 | M5 | M6 | M7 | M8 |
|---|---|---|---|---|---|---|---|---|
| INTERCONNECTION PITCH [um] | 15 | 300 | 300 | 300 | 500 | 500 | 500 | 500 |
| INTERCONNECTION WIDTH [um] | 1 | 10 | 10 | 10 | 20 | 20 | 20 | 20 |
| INTERCONNECTION DIRECTION | H | V | H | V | H | V | H | V |

34 33  26 32 31  20

ESD ANALYSIS APPARATUS

CROSS-REFERENCE TO RELATED APPLICATIONS

This application is based upon and claims the benefit of priority from Japanese Patent Application No. 2012-150315, filed on Jul. 4, 2012; the entire contents of which are incorporated herein by reference.

FIELD

Embodiments described herein relate generally to an electrostatic discharge (ESD) analysis apparatus.

BACKGROUND

As a method of performing ESD analysis of an electronic device, there have been usually used three analysis models: a human body model (HBM); a machine model (MM); and a charged device model (CDM). In the MM and the CDM, static electricity generated in a process of manufacturing an electronic device is modeled, and, for example, charging when a printed board is conveyed, when a large scale integration (LSI) is taken out from a packaging material, or the like is assumed. In the HBM, static electricity generated under the circumstances in which a user uses an electronic device is modeled, and, for example, charging when a hand comes into contact with an exposed terminal is assumed.

DETAILED DESCRIPTION

In general, according to one embodiment, a chip model generating unit and a counter tester ground capacitance adding unit are provided. The chip model generating unit generates a chip model based on an ESD protection circuit network model to which an inter power net capacitance of a semiconductor chip is added. The counter tester ground capacitance adding unit adds a counter tester ground capacitance to the chip model.

Hereinafter, an ESD analysis apparatus according to an embodiment will be described in detail with reference to the accompanying drawings. The present invention is not limited to the following embodiment.

Figure 1:
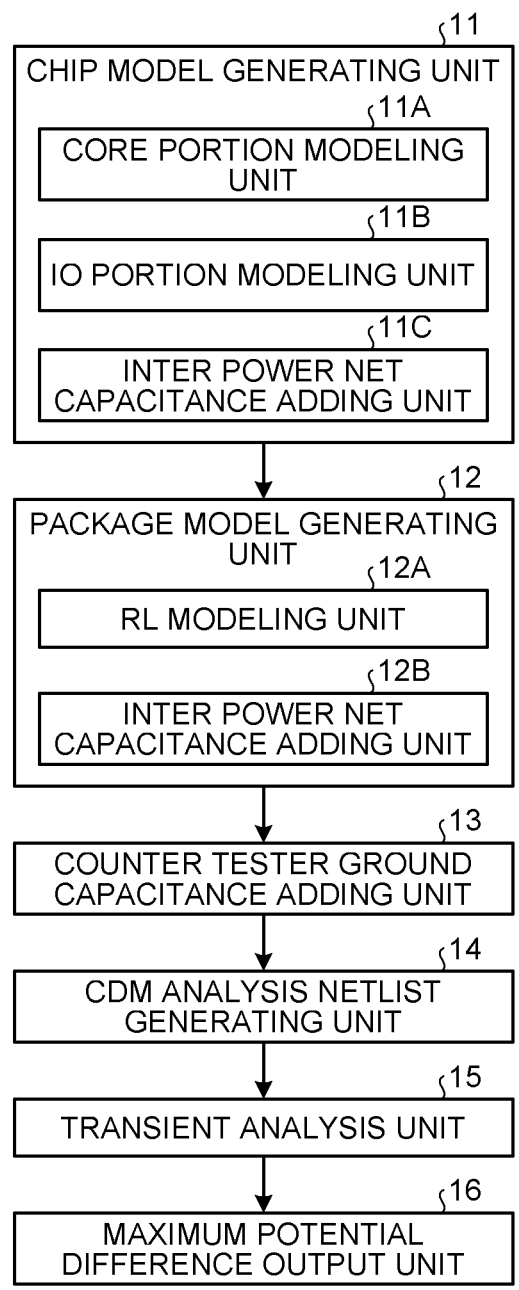
FIG. 1 is a block diagram illustrating a schematic configuration of an ESD analysis apparatus according to an embodiment.
Figure 2:
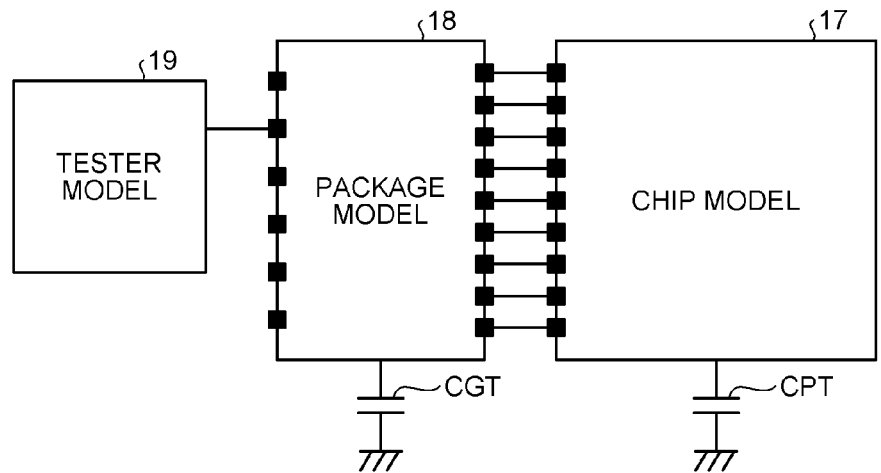
FIG. 2 is a block diagram illustrating a schematic configuration of an analysis model used in the ESD analysis apparatus of FIG. 1.

FIG. 1 is a block diagram illustrating a schematic configuration of an ESD analysis apparatus according to an embodiment, and FIG. 2 is a block diagram illustrating a schematic configuration of an analysis model used in the ESD analysis apparatus of FIG. 1.

Referring to FIG. 1, the ESD analysis apparatus includes a chip model generating unit 11, a package model generating unit 12, a counter tester ground capacitance adding unit 13, a CDM analysis netlist generating unit 14, a transient analysis unit 15, and a maximum potential difference output unit 16. Here, the chip model generating unit 11 includes a core portion modeling unit 11A, an IO portion modeling unit 11B, and an inter power net capacitance adding unit 11C. The package model generating unit 12 includes an RL modeling unit 12A and an inter power net capacitance adding unit 12B.

Referring to FIG. 2, the analysis model includes a chip model 17, a package model 18, and a tester model 19. The chip model 17 is one in which a semiconductor chip used as a target of ESD analysis is modeled. The package model 18 is one in which a semiconductor package including a semiconductor chip mounted therein is modeled. The semiconductor package may be a quad flat package (QFP), a flip chip-ball grid array (FC-BGA), or a plastic ball grid array (PBGA). The tester model 19 is one in which a tester used for ESD analysis is modeled.

The chip model generating unit 11 of FIG. 1 generates the chip model 17 based on an ESD protection circuit network model to which an inter power net capacitance of a semiconductor chip is added. The semiconductor chip may include a core portion and an IO portion. The core portion may include a logic circuit, a memory cell array, and the like. An IO cell in which an electrostatic protection element is disposed may be arranged in the IO portion. The IO portion may connect the core portion with a pad electrode, and be arranged on the periphery of the core portion. The inter power net capacitance refers to a capacitance between different power nets. For example, the power net refers to a power source plane, a power interconnection, a ground plane, or the like. Further, separate power nets may be disposed for a digital power source and an analog power source. The package model generating unit 12 generates the package model 18 based on an equivalent circuit model to which an inter power net capacitance of a semiconductor package including a semiconductor chip mounted therein is added. The counter tester ground capacitance adding unit 13 adds counter tester ground capacitances CPT and CGT to the chip model 17 and the package model 18, respectively. The counter tester ground capacitances CPT and CGT refer to a capacitance between a ground of a tester used for ESD analysis and a semiconductor chip and a capacitance between a ground of a tester used for ESD analysis and a semiconductor package, respectively. The CDM analysis netlist generating unit 14 generates a CDM analysis netlist based on a connection relation between the chip model 17, the package model 18, and the tester model 19. The transient analysis unit 15 performs transient analysis of an equivalent circuit generated based on the CDM analysis netlist. The maximum potential difference output unit 16 outputs a maximum potential difference between nodes disposed in the equivalent circuit that has been subjected to the transient analysis by the transient analysis unit 15. The core portion modeling unit 11A models the core portion of the semiconductor chip by a resistive network. The IO portion modeling unit 11B generates an ESD protection circuit network model based on a connection state between an electrostatic protection element and the resistive network of the IO portion of the semiconductor chip. The inter power net capacitance adding unit 11C adds the inter power net capacitance of the core portion to the resistive network generated by the core portion modeling unit 11A, and adds the inter power net capacitance of the IO portion to the ESD protection circuit network model generated by the IO portion modeling unit 11B. The RL modeling unit 12A models an interconnection of the semiconductor package based on a connection relation between a resistor and an inductor. When the semiconductor package is the QFP, the PBGA, or the like, the interconnection of the semiconductor package may include a bonding wire and a substrate interconnection. The inter power net capacitance adding unit 12B adds the inter power net capacitance of the semiconductor package between the power nets described by the connection relation between the resistor and the inductor.

Further, the chip model generating unit 11 generates the chip model 17 such that the core portion of the semiconductor chip is modeled by the resistive network, and the IO portion of the semiconductor chip is modeled based on the connection relation between the electrostatic protection element and the resistive network. When the IO portion of the semiconductor chip is modeled, distributed resistors of power interconnection of the IO portion of the semiconductor chip and a connection relation of a pad electrode may be added. At this time, the inter power net capacitance of the semiconductor chip is added between the power nets of the core portion and between the power nets of the IO portion, respectively. When the inter power net capacitance of the semiconductor chip is added between the power nets of the core portion, the inter power net capacitance can be equally distributed between the power nets of the core portion.

The package model generating unit 12 generates the package model 18 such that the interconnection of the semiconductor package is modeled by an RL equivalent circuit. At this time, the inter power net capacitance of the semiconductor package is added between the power nets. When the inter power net capacitance of the semiconductor package is added between the power nets, the inter power net capacitance can be equally distributed between the power nets.

The counter tester ground capacitance adding unit 13 adds the counter tester ground capacitance CPT between a power net of the chip model 17 and a tester ground TGN, and adds the counter tester ground capacitance CGT between a power net of the package model 18 and a tester ground TGN. When the counter tester ground capacitance CPT is added between the power net of the chip model 17 and the tester ground TGN, the counter tester ground capacitance CPT can be equally distributed between the power net and the tester ground TGN. Further, when the counter tester ground capacitance CGT is added between the power net of the package model 18 and the tester ground TGN, the counter tester ground capacitance CGT can be equally distributed between the power net and the tester ground TGN.

The CDM analysis netlist generating unit 14 generates the CDM analysis netlist such that the chip model 17 is connected to the package model 18, and the package model 18 is connected to the tester model 19.

As initial values of the counter tester ground capacitances CPT and CGT are set to an applied voltage of a CDM test and a switch of the tester is turned on, the transient analysis unit 15 performs the transient analysis of the equivalent circuit generated based on the CDM analysis netlist. In the transient analysis, nodes can be set to the equivalent circuit generated based on the CDM analysis netlist, and voltage waveforms of the nodes can be obtained. The maximum potential difference output unit 16 calculates a maximum potential difference between the nodes, and outputs the maximum potential difference. Further, the CDM tolerance of the semiconductor chip can be evaluated by comparing the maximum potential difference with a threshold value.

Here, as the inter power net capacitance and the counter tester ground capacitances CPT and CGT are added to the chip model 17 and the package model 18, respectively, the CDM tolerance of the semiconductor chip can be evaluated, and it is possible to determine whether or not the semiconductor chip is to be destroyed due to static electricity generated in the manufacturing process.

The above-described embodiment has been described in connected with the method of evaluating the CDM tolerance of the semiconductor chip using the chip model 17 and the package model 18, but the CDM tolerance of the semiconductor chip may be also evaluated before the chip model 17 is connected directly to the tester model 19 and mounted in the semiconductor package.

Figure 3:
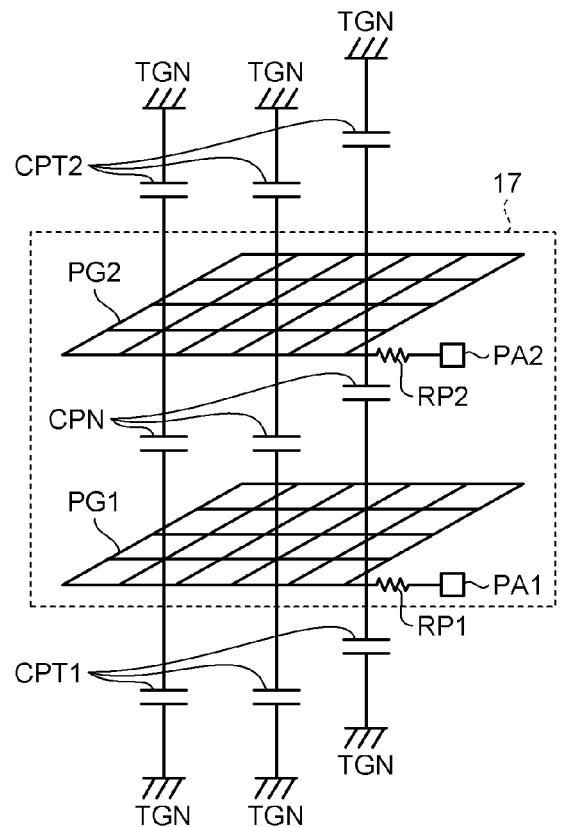
FIG. 3 is a diagram illustrating a schematic configuration of a core portion of a chip model to which counter tester ground capacitances of FIG. 2 are added.

The analysis model of FIG. 2 will be described below in detail. FIG. 3 is a diagram illustrating a schematic configuration of the core portion of the chip model to which the counter tester ground capacitances of FIG. 2 are added.

Referring to FIG. 3, power grids PG1 and PG2 are disposed in the core portion of the chip model 17. The power grids PG1 and PG2 may be disposed for different power nets, respectively. For example, the power grid PG1 may correspond to power potential VDD, and the power grid PG2 may correspond to ground potential VSS. The resistive network corresponding to the power interconnection may be set to the power grids PG1 and PG2. A resistance value of the resistive network may be set for each unit grid based on power interconnection information. The power interconnection information may include a power interconnection pitch, a power interconnection width, and a power interconnection direction. The power grid PG1 is connected to a pad electrode PA1 via a resistor RP1, and the power grid PG2 is connected to a pad electrode PA2 via a resistor RP2. An inter power net capacitor CPN is added between the power grids PG1 and PG2. A counter tester ground capacitor CPT1 is added between the power grid PG1 and the tester ground TGN. The counter tester ground capacitor CPT2 is added between the power grid PG2 and the tester ground TGN.

Figure 4:
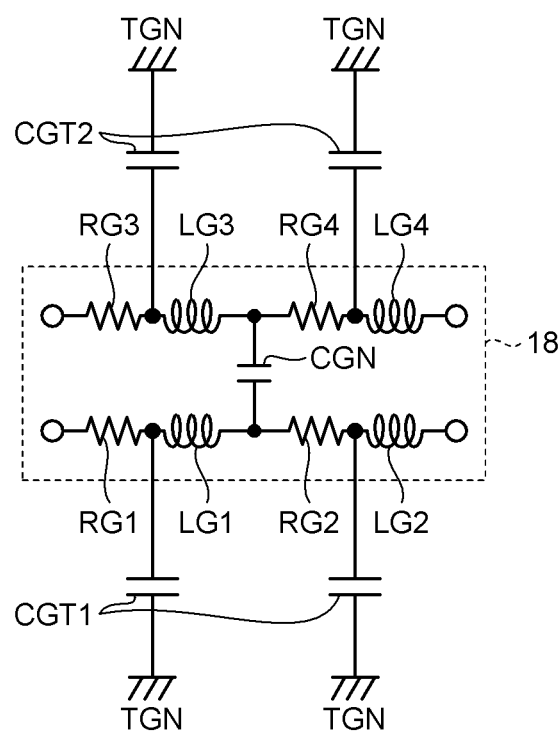
FIG. 4 is a diagram illustrating a schematic configuration of a package model to which the counter tester ground capacitances of FIG. 2 are added.

FIG. 4 is a diagram illustrating a schematic configuration of a package model to which the counter tester ground capacitances of FIG. 2 are added.

Referring to FIG. 4, the package model 18 includes an equivalent circuit that includes resistors RG1 to RG4 and inductors LG1 to LG4 and is disposed for each power net. An inter power net capacitor CGN is added between power nets of the equivalent circuit. A counter tester ground capacitor CGT1 is added between the equivalent circuit including the resistors RG1 and RG2 and the inductors LG1 and LG2 and the tester ground TGN. A counter tester ground capacitor CGT2 is added between the equivalent circuit including the resistors RG3 and RG4 and the inductors LG3 and LG4 and the tester ground TGN.

Figure 5A:
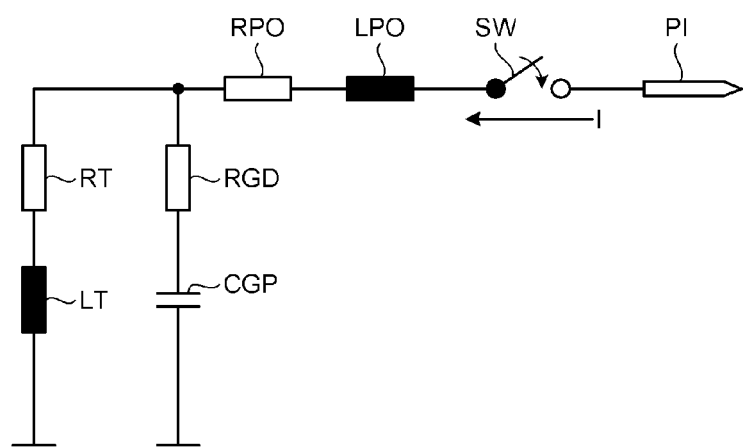
FIG. 5A is a diagram illustrating a schematic configuration of a tester model of FIG. 2.
Figure 5B:
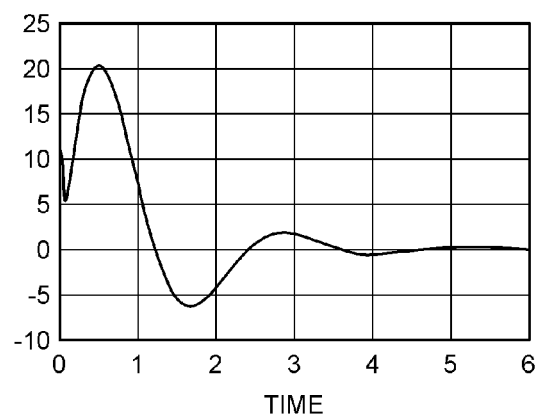
FIG. 5B is a diagram illustrating a waveform of a transient current of the tester model.

FIG. 5A is a diagram illustrating a schematic configuration of the tester model of FIG. 2, and FIG. 5B is a diagram illustrating a waveform of a transient current of the tester model.

Referring to FIG. 5A, the tester model 19 includes resistors RPO, RGD, and RT, inductors LPO and LT, and a capacitor CGP. The resistor RPO is a Pogo pin resistor, the resistor RGD is a ground plane resistor, and the resistor RT is a tester resistor. The inductor LPO is a Pogo pin inductor, and the inductor LT is a tester inductor. The capacitor CGP is a ground plane capacitor.

The resistor RPO and the inductor LPO are serially connected to each other, the resistor RGD and the capacitor CGP are serially connected to each other, and the resistor RT and the inductor LT are serially connected to each other. The series circuit of resistor RT and the inductor LT is connected to the series circuit of the resistor RGD and the capacitor CGP in parallel, and the parallel circuit is serially connected to the series circuit of the resistor RPO and the inductor LPO. The series circuit is connected to a Pogo pin PI via a switch SW.

The ESD analysis of the semiconductor chip may be performed such that when initial values of the counter tester ground capacitors CPT1, CPT2, CGT1, and CGT2 are set to an applied voltage of the CDM test and then the switch SW is turned on, a transient current I flows as illustrated in FIG. 5B.

Figure 6:
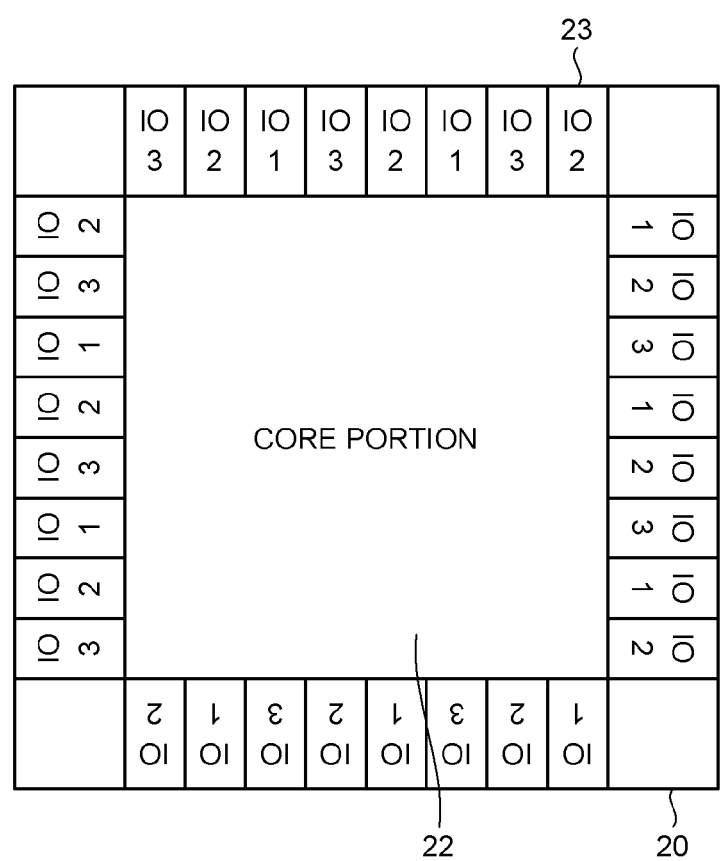
FIG. 6 is a plan view illustrating a layout configuration example of an integrated circuit (IC) to which ESD analysis according to an embodiment is applied.

FIG. 6 is a plan view illustrating a layout configuration example of an integrated circuit (IC) to which ESD analysis according to an embodiment is applied.

Referring to FIG. 6, a core portion 22 and an IO portion 23 are disposed on a chip region 20. A logic circuit, a memory cell array, and the like may be disposed on the core portion 22. IO cells 1 to 3 may be arranged on the IO portion 23. An electrostatic protection element is disposed in each of the IO cells 1 to 3. The IO cells 1 to 3 may differ in kind from one another. Here, the core portion 22 is arranged to be surrounded by the IO cells 1 to 3. Thus, an arrangement region of the core portion 22 can be decided by arranging the IO cells 1 to 3.

Figures 7, 8:
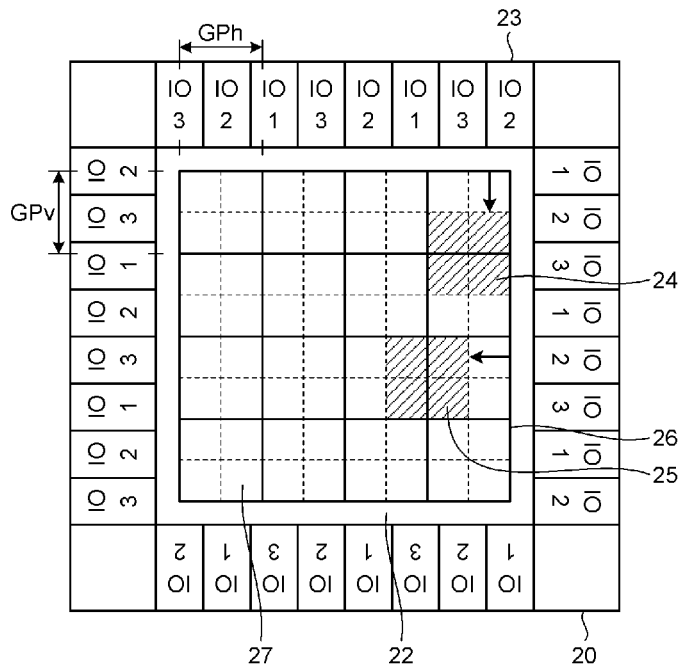
FIG. 7 is a plan view illustrating a method of modeling a core portion of the integrated circuit of FIG. 6.
FIG. 8 is a diagram illustrating an example of interconnection information used for modeling of the core portion of FIG. 7.

FIG. 7 is a plan view illustrating a method of modeling the core portion of the integrated circuit of FIG. 6.

Referring to FIG. 7, a resistive network 26 is set by modeling of the core portion 22. At this time, a grid having a horizontal grid interval GPh in a horizontal direction and a vertical grid interval GPv in a vertical direction is generated in the core portion 22. A resistance value of the resistive network 26 is set for each unit grid 27.

In other words, a horizontal resistive cell 24 is arranged at the position at which the unit grid 27 of the grid of the resistive network 26 is moved, in the vertical direction, by half of the grid. The width of the horizontal resistive cell 24 in the horizontal direction is the horizontal grid interval GPh, and the width of the horizontal resistive cell 24 in the vertical direction is the vertical grid interval GPv. A vertical resistive cell 25 is arranged at the position at which the unit grid 27 is moved in the horizontal direction by half of the grid. The width of the vertical resistive cell 25 in the horizontal direction is the horizontal grid interval GPh, and the width of the vertical resistive cell 25 in the vertical direction is the vertical grid interval GPv.

Next, based on interconnection information, a horizontally combined resistance Rh of the horizontal resistive cell 24 is calculated, and a vertically combined resistance Rv of the vertical resistive cell 25 is calculated.

FIG. 8 is a diagram illustrating an example of interconnection information used for modeling of the core portion of FIG. 7. FIG. 8 illustrates an example in which eight layers, that is, interconnection layers M1 to M8 are disposed in the core portion 22.

Referring to FIG. 8, an interconnection pitch, an interconnection width, and an interconnection direction are recorded for each of the interconnection layers M1 to M8 as the interconnection information. Here, H represents the horizontal direction, and V represents the vertical direction.

Figure 9A:
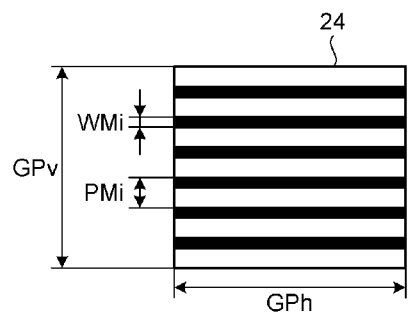
FIGS. 9A and 9B are diagrams illustrating a method of calculating a horizontally combined resistance used for modeling of the core portion of FIG. 7.
Figure 9B:
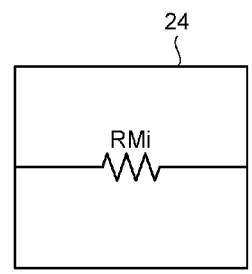

FIGS. 9A and 9B are diagrams illustrating a method of calculating the horizontally combined resistance used for modeling of the core portion of FIG. 7.

Referring to FIGS. 9A and 9B, when the layers M1, M3, M5, and M7 of the power interconnection in the horizontal direction are referred to as "Mi," a combined resistance RMi of the horizontal resistive cell 24 of the power interconnection of the single layer Mi is obtained by Formula (1). The horizontally combined resistance Rh is obtained by Formula (2) based on the parallel connection of the combined resistance RMi of the layer Mi of all of a plurality of layers M1, M3, M5, and M7 of the same horizontal resistive cell 24.

$$RMi = RsMi \cdot GPh/(GPv \cdot WMi/PMi) \tag{1}$$

$$Rh = 1/\Sigma i(1/RMi) \tag{2}$$

Here, RsMi is a sheet resistance of the layer Mi, WMi is an interconnection width of the layer Mi, and PMi is an interconnection pitch of the layer Mi.

Figure 10A:
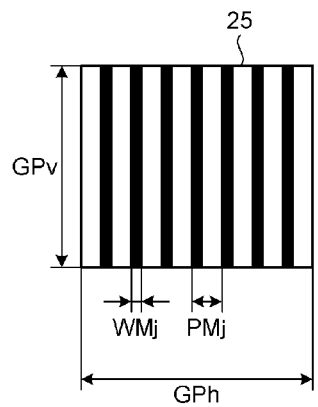
FIGS. 10A and 10B are diagrams illustrating a method of calculating a vertically combined resistance used for modeling of the core portion of FIG. 7.
Figure 10B:
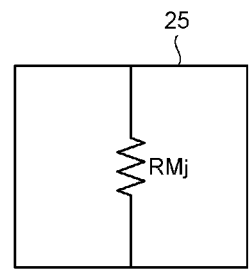

FIGS. 10A and 10B are diagrams illustrating a method of calculating the vertically combined resistance used for modeling of the core portion of FIG. 7.

Referring to FIGS. 10A and 10B, when the layers M2, M4, M6, and M8 of the power interconnection in the vertical direction are referred to as "Mj," a combined resistance RMj of the vertical resistive cell 25 of the power interconnection of the single layer Mj is obtained by Formula (3). The vertically combined resistance Rv is obtained by Formula (4) based on the parallel connection of the combined resistance RMj of the layer Mj of all of a plurality of layers M2, M4, M6, and M8 of the same vertical resistive cell 25.

$$RMj = RsMj \cdot GPv/(GPh \cdot WMj/PMj) \quad (3)$$

$$Rv = 1/\Sigma j(1/RMj) \quad (4)$$

Here, RsMj is a sheet resistance of the layer Mj, WMj is an interconnection width of the layer Mj, and PMj is an interconnection pitch of the layer Mj.

Figure 11:
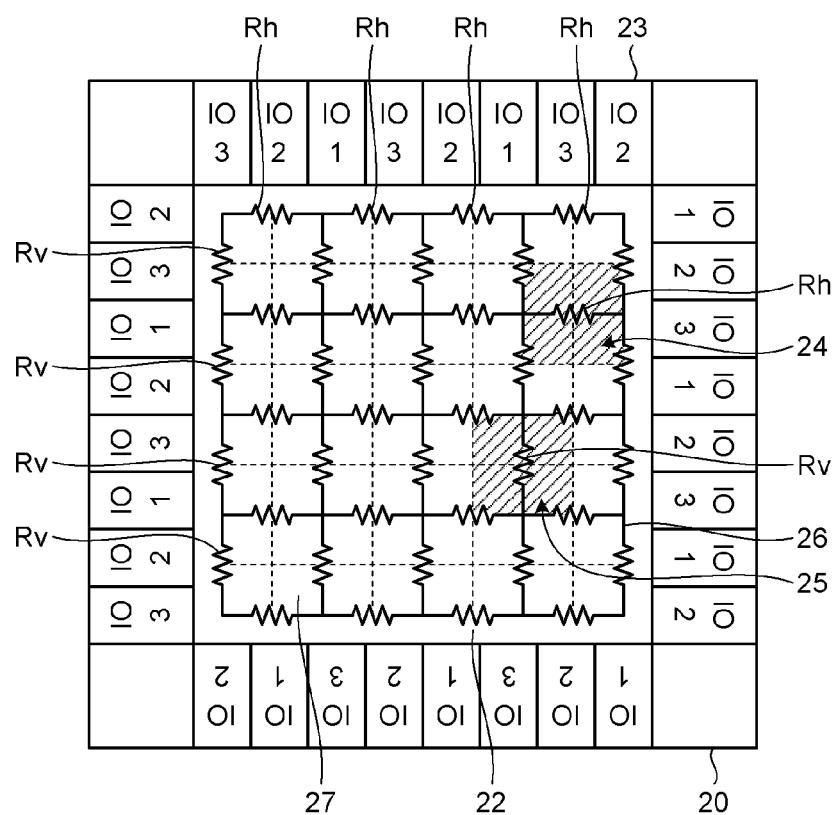
FIG. 11 is a plan view illustrating a layout method of a horizontally combined resistance and a vertically combined resistance used for modeling of the core portion of FIG. 7.

FIG. 11 is a plan view illustrating a layout method of the horizontally combined resistance and the vertically combined resistance used for modeling of the core portion of FIG. 7.

Referring to FIG. 11, the horizontally combined resistances Rh are horizontally set around the unit grid 27 overlapping the horizontal resistive cell 24. The vertically combined resistances Rv are vertically set around the unit grid 27 overlapping the vertical resistive cell 25. As a result, the resistive network 26 is set to the core portion 22. The resistive network 26 includes a power resistive network that is an equivalent circuit of a power interconnection settable to the power potential VDD and a ground resistive network that is an equivalent circuit of a power interconnection settable to the ground potential VSS. For this reason, the resistive network 26 is generated for each of the interconnection of the power potential VDD and the interconnection of the ground potential VSS.

Figure 12:
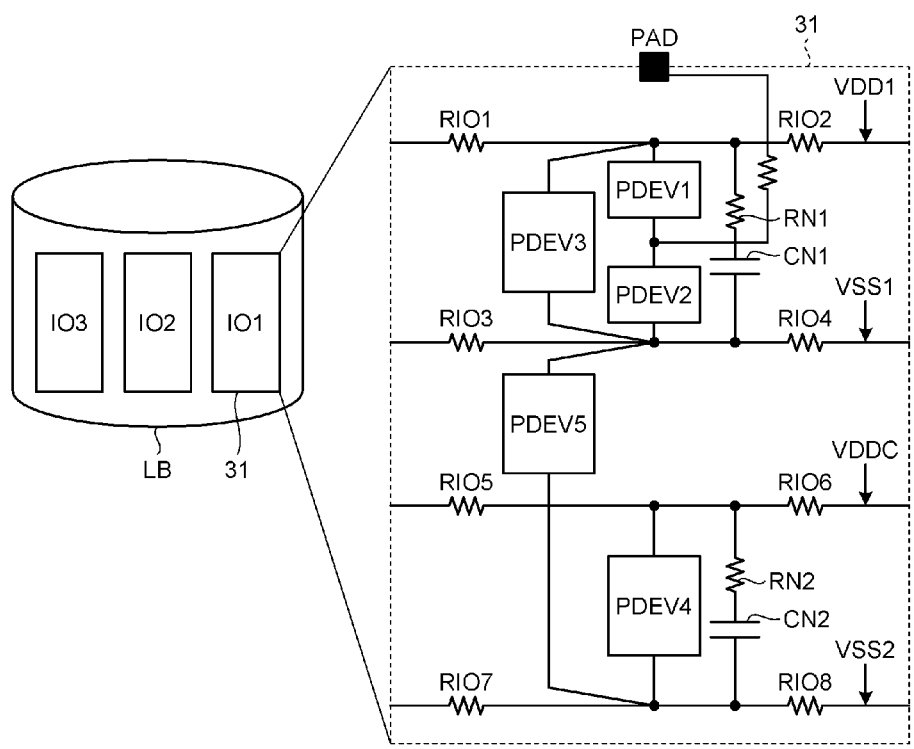
FIG. 12 is a block diagram illustrating a configuration example of an IO cell library used for modeling of the IO portion of FIG. 7.

FIG. 12 is a block diagram illustrating a configuration example of an IO cell library used for modeling of the IO portion of FIG. 7.

Referring to FIG. 12, an ESD protection circuit network model is generated by modeling of the IO portion. At this time, a library LB in which cell models 31 of the IO cells 1 to 3 are constructed in the form of a library may be prepared. Distributed resistors RIO1 to RIO8 of power source rings VDD1, VSS1, VDDC, and VSS2 which are connected to one another, protection elements PDEV1 to PDEV5, and a pad PAD are registered to the cell model 31 for each of the IO cells 1 to 3. Further, a connection relation of the distributed resistors RIO1 to RIO8, the protection elements PDEV1 to PDEV5, and the pad PAD on the resistive network 26 is registered to the cell model 31. For example, the resistive network 26 is connected to a connection point of the distributed resistors RIO7 and RIO8 and the protection elements PDEV4 and PDEV5.

Figure 13:
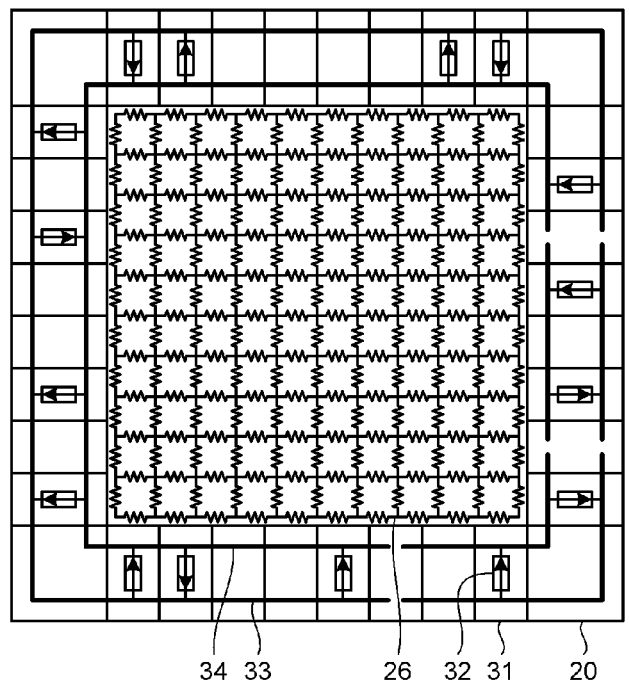
FIG. 13 is a plan view illustrating an example of the chip model of the integrated circuit of FIG. 6.

FIG. 13 is a plan view illustrating an example of the chip model of the integrated circuit of FIG. 6.

Referring to FIG. 13, in the chip model 17, the resistive network 26 is arranged in the core portion 22 of the chip region 20. Further, in the IO portion 23 of the chip region 20, the cell model 31 is arranged for each of the IO cells 1 to 3. Each of power source rings 33 and 34 of the same power net is connected between the neighboring cell models 31. An electrostatic protection element 32 may be connected between the power source rings 33 and 34.

Figure 14:
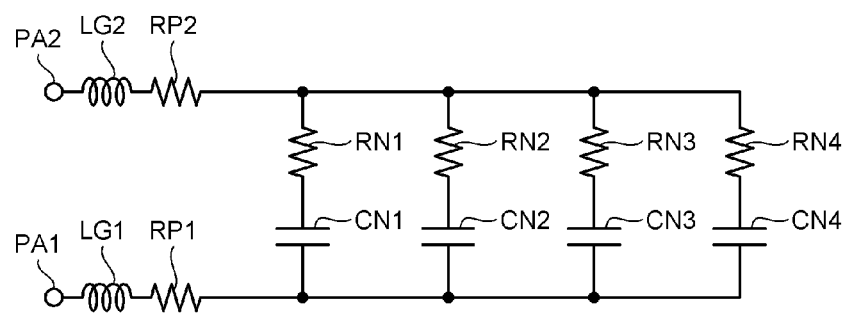
FIG. 14 is a circuit diagram illustrating a method of adding an inter power net capacitance in the chip model of the integrated circuit of FIG. 6.

FIG. 14 is a circuit diagram illustrating a method of adding an inter power net capacitance in the chip model of the integrated circuit of FIG. 6.

Referring to FIG. 14, the inter power net capacitor CPN of the core portion 22 of the chip model 17 may include a well capacitor CN1, a decoupling capacitor CN2, a power interconnection capacitor CN3, and a non-switching cell capacitor CN4 of the core portion 22. The well capacitor CN1 is serially connected to a well resistor RN1, the decoupling capacitor CN2 is serially connected to a decoupling resistor RN2, the power interconnection capacitor CN3 is serially connected to a power interconnection resistor RN3, and the non-switching cell capacitor CN4 is serially connected to a non-switching cell resistor RN4. The four series circuits are connected to one another in parallel. One end of the parallel circuit is connected to a pad electrode PA1 via a resistor RP1 and an inductor LG1, and the other end of the parallel circuit is connected to a pad electrode PA2 via a resistor RP2 and an inductor LG2.

A value of the well capacitor CN1 may be estimated by a formula such as (well capacitance per unit area)*(core area). A value of the decoupling capacitor CN2 may be estimated by a formula such as (decoupling capacitance per unit area)*(total area of decoupling cell). A value of the power interconnection capacitor CN3 may be estimated from an interconnection capacitance obtained by electric field analysis and power interconnection information. A value of the non-switching cell capacitor CN4 may be estimated by a formula such as (power consumption except clock system)/((clock frequency)*(power voltage)$^2$)*(1−(toggle rate))/(toggle rate).

Figure 15:
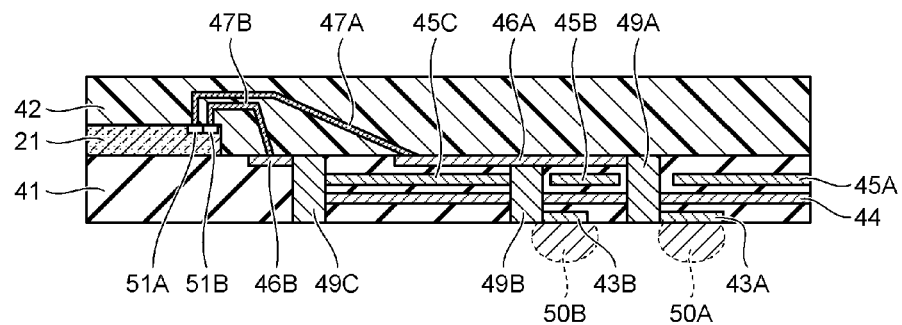
FIG. 15 is a cross-sectional diagram illustrating a schematic configuration of a semiconductor package to which ESD analysis according to an embodiment is applied.

FIG. 15 is a cross-sectional diagram illustrating a schematic configuration of a semiconductor package to which ESD analysis according to an embodiment is applied.

Referring to FIG. 15, the semiconductor package is provided with a mounting substrate 41. For example, the PBGA is used as the semiconductor package. For example, the mounting substrate 41 has a four-layer interconnection structure. Further, land electrodes 43A and 43B are disposed on a first layer of the mounting substrate 41 (a back surface of the mounting substrate 41), a ground plane 44 is disposed on a second layer of the mounting substrate 41, the mounting interconnections 45A to 45C are disposed on a third layer of the mounting substrate 41, and the mounting interconnection 46A and a power source ring 46B are disposed on a fourth layer of the mounting substrate 41 (the top surface of the mounting substrate 41). Further, through hole electrodes 49A to 49C are buried in the mounting substrate 41. The power source ring 46B is connected to the mounting interconnection 45C via the through hole electrode 49C, and the mounting interconnection 45C is connected to the land electrode 43B via the through hole electrode 49B. The mounting interconnection 46A is connected to the land electrode 43A via the through hole electrode 49A. Protruding electrodes 50A and 50B are formed on the land electrodes 43A and 43B, respectively. As the protruding electrodes 50A and 50B, a solder ball may be used, and an Au bump, a Ni bump, or the like may be used.

A semiconductor chip 21 is mounted on the mounting substrate 41. A signal pad 51A of the semiconductor chip 21 is connected to the mounting interconnection 46A via a bonding wire 47A, and a power pad 51B of the semiconductor chip 21 is connected to the power source ring 46B via a bonding wire 47B.

Figure 16:
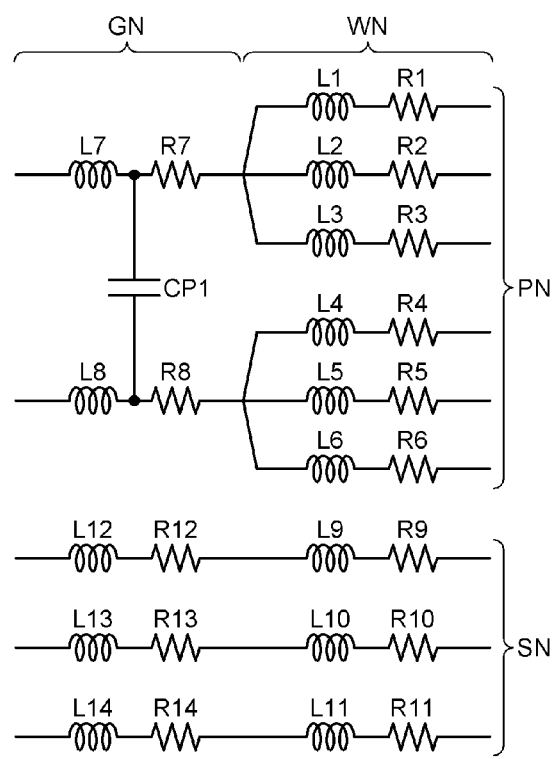
FIG. 16 is a circuit diagram illustrating an example of a package model of the semiconductor package of FIG. 15.

FIG. 16 is a circuit diagram illustrating an example of the package model of the semiconductor package of FIG. 15.

Referring to FIG. 16, in the package model 18, the interconnection of the semiconductor package may be modeled such that the interconnection is divided into a signal interconnection portion SN and a power interconnection portion PN of the semiconductor package of FIG. 15. Further, the interconnection of the semiconductor package may be modeled such that the interconnection is divided into a bonding wire portion WN and a substrate interconnection portion GN of the semiconductor package. In modeling of the interconnection of the semiconductor package, each interconnection is represented by an RL equivalent circuit, and the RL equivalent circuit may be connected depending on the connection state of the interconnection of the semiconductor package. Further, when the inter power net capacitance of the semiconductor package is added, an inter power net capacitance may be added between the power nets in the RL equivalent circuit of the substrate interconnection portion GN of the power interconnection portion PN.

For example, in the power interconnection portion PN, six bonding wires are modeled by series circuits of resistors R1 to R6 and inductors L1 to L6. Further, two power source rings are modeled by series circuits of resistors R7 and R8 and inductors L7 and L8. The series circuits of the resistors R1 to R3 and the inductors L1 to L3 are connected to each other in parallel, and this parallel circuit is serially connected to the series circuit of the resistor R7 and the inductor L7. The series circuits of the resistors R4 to R6 and the inductors L4 to L6 are connected to each other in parallel, and this parallel circuit is serially connected to the series circuit of the resistor R8 and the inductor L8. An inter power net capacitor CP1 is added between a connection point of the resistor R7 and the inductor L7 and a connection point of the resistor R8 and the inductor L8.

In the signal interconnection portion SN, three bonding wires are modeled by series circuits of resistors R9 to R11 and inductors L9 to L11. Further, three substrate interconnections are modeled by series circuits of resistors R12 and R14 and inductors L12 to L14. The series circuit of the resistor R9 and the inductor L9 is serially connected to the series circuit of the resistor R12 and the inductor L12, the series circuit of the resistor R10 and the inductor L10 is serially connected to the series circuit of the resistor R13 and the inductor L13, and the series circuit of the resistor R11 and the inductor L11 is serially connected to the series circuit of the resistor R14 and the inductor L14.

Figure 17:
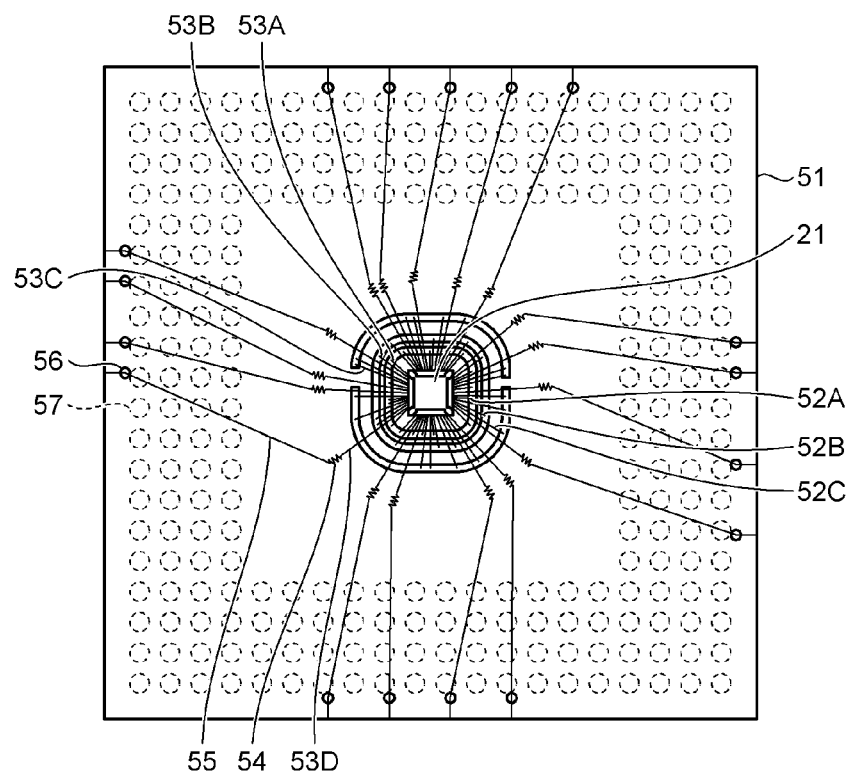
FIG. 17 is a plan view illustrating an example of a semiconductor package in which the package model of FIG. 2 is generated.
Figure 18:
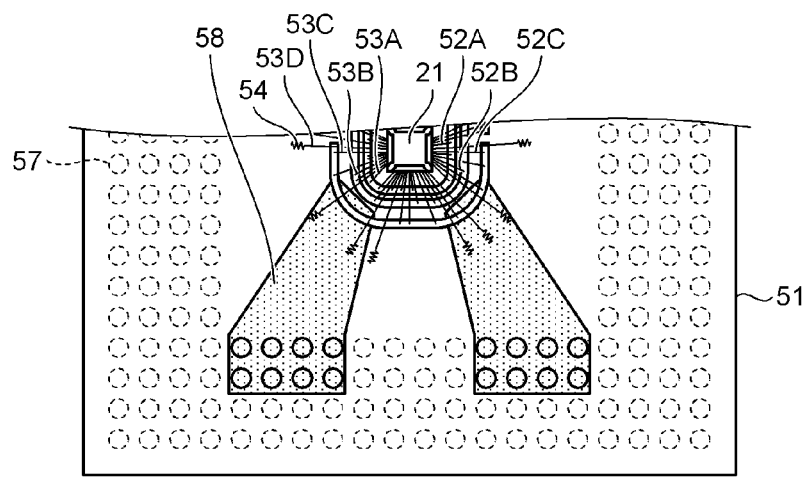
FIG. 18 is a plan view illustrating an RL calculation method of a power source plane of the semiconductor package of FIG. 17.

FIG. 17 is a plan view illustrating an example of a semiconductor package in which the package model of FIG. 2 is generated, and FIG. 18 is a plan view illustrating an RL calculation method of a power source plane of the semiconductor package of FIG. 17.

Referring to FIG. 17, the semiconductor package is provided with a mounting substrate 51. For example, the PBGA is used as the semiconductor package. The semiconductor chip 21 is mounted on the mounting substrate 51. Further, power source rings 52A to 52C and a substrate interconnection 55 are formed on the mounting substrate 51. FIG. 17 illustrates an example in which the power source rings 52A to 52C configure a triple ring. Here, the power source rings 52A to 52C may be arranged around the semiconductor chip 21. The substrate interconnection 55 may be arranged outside the power source rings 52A to 52C. A bonding finger 54 is disposed on the mounting substrate 51, and a through hole electrode 56 is buried in the mounting substrate 51. The bonding finger 54 is connected to one end of the substrate interconnection 55. A protruding electrode 57 is arranged on the back surface of the mounting substrate 51.

The power pad of the semiconductor chip 21 is connected to the power source rings 52A to 52C through bonding wires 53A to 53C, and a signal pad of the semiconductor chip 21 is connected to the bonding finger 54 through the bonding wire 53D.

The bonding finger 54 and the protruding electrode 57 are assigned to each signal pad of the semiconductor chip 21. A signal wire length of the bonding wire 53D is estimated based on a distance between each signal pad of the semiconductor chip 21 and the bonding finger 54, and then RL of each bonding wire 53D can be estimated based on RL and the signal wire length of a signal wire per unit length.

A substrate interconnection length of the substrate interconnection 55 is estimated based on the distance between the bonding finger 54 and the protruding electrode 57, and then RL of the substrate interconnection 55 can be estimated based on RL and the substrate interconnection length of the substrate interconnection per unit length. The RL of the through hole electrode 56 can be added to the RL of the substrate interconnection 55.

The power source rings 52A to 52C are assigned to each power pad of the semiconductor chip 21. The power wire length of each of the bonding wires 53A to 53C is estimated based on the distance between each power pad of the semiconductor chip 21 and the power source rings 52A to 52C, and then RL of each of the bonding wires 53A to 53C can be estimated based on RL and the power wire length of the power wire per unit length.

The shape of a power source plane 58 is made as illustrated in FIG. 18. RL of the power source plane 58 can be estimated based on the shape of the power source plane 58. The RL of the through hole electrode 56 can be added to the RL of the power source plane 58.

Figure 19:
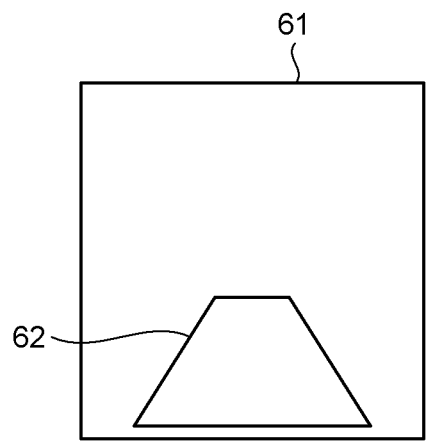
FIG. 19 is a diagram illustrating a method of calculating an inter power net capacitance of the semiconductor package of FIG. 17.

FIG. 19 is a diagram illustrating a method of calculating an inter power net capacitance of the semiconductor package of FIG. 17. Referring to FIG. 19, the power source planes 61 and 62 of the mounting substrate 51 overlap each other. The power source planes 61 and 62 are assumed to belong to different power nets. At this time, the inter power net capacitance of the semiconductor package can be estimated as a parallel plate capacitance based on the overlapping area between the power source planes 61 and 62 and the inter-wire distance.

Figure 20:
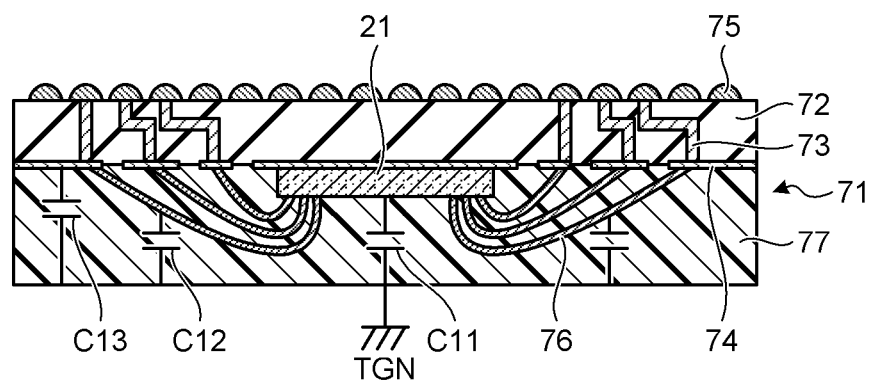
FIG. 20 is a diagram illustrating an addition method of a counter tester ground capacitance to be added to the chip model of FIG. 3 and the package model of FIG. 4.

FIG. 20 is a diagram illustrating an addition method of the counter tester ground capacitance to be added to the chip model of FIG. 3 and the package model of FIG. 4.

Referring to FIG. 20, a semiconductor package 71 is provided with a mounting substrate 72. The semiconductor chip 21 is mounted on the mounting substrate 72. The power interconnection 74 is formed on the mounting substrate 72, and a through hole electrode 73 is buried in the mounting substrate 72. A protruding electrode 75 is arranged on the back surface of the mounting substrate 72. The power interconnection 74 is connected to the protruding electrode 75 through the through hole electrode 73. The power pad of the semiconductor chip 21 is connected to the power interconnection 74 through the bonding wire 76. The semiconductor chip 21 and the bonding wire 76 are sealed on the mounting substrate 72 by sealing resin 77. By performing parallel plate approximation based on an interconnection area of each power net, counter tester ground capacitances C11, C12, and C13 with the tester ground TGN can be individually estimated. The counter tester ground capacitance C11 is a counter tester ground capacitance on the semiconductor chip 21. The counter tester ground capacitance C12 is a counter tester ground capacitance on a bonding wire 76. The counter tester ground capacitance C13 is a counter tester ground capacitance on the power interconnection 74.

Figure 21:
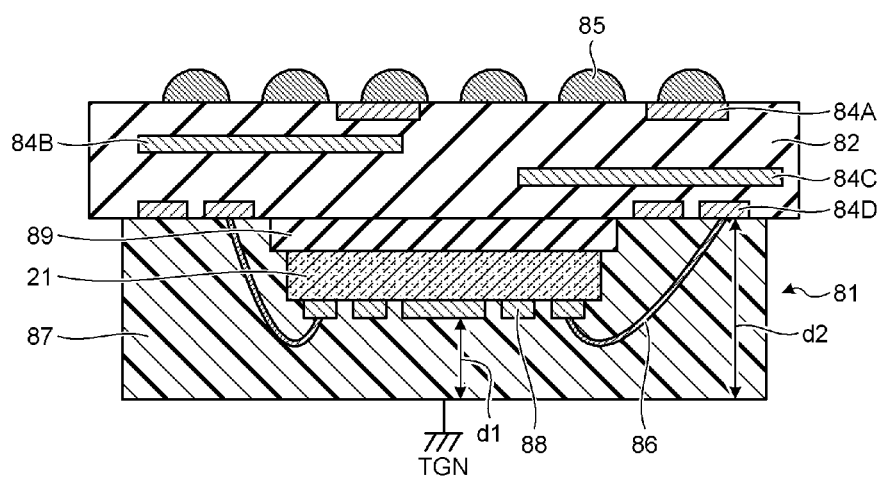
FIG. 21 is a cross-sectional diagram illustrating an example of a method of calculating a counter tester ground capacitance to be added to the chip model of FIG. 3 and the package model of FIG. 4.

FIG. 21 is a cross-sectional diagram illustrating a method of calculating a counter tester ground capacitance to be added to the chip model of FIG. 3 and the package model of FIG. 4.

Referring to FIG. 21, a semiconductor package 81 is provided with a mounting substrate 82. The semiconductor chip 21 is mounted on the mounting substrate 82 with an adhesive layer 89 interposed therebetween. A land electrode 84A is formed on a first layer of the mounting substrate 82, a ground plane 84B is formed on a second layer of the mounting substrate 82, a mounting interconnection 84C is formed on a third layer of the mounting substrate 82, and a power interconnection 84D is formed on a fourth layer of the mounting substrate 82. A protruding electrode 85 is arranged on the land electrode 84A. The power pad 88 of the semiconductor chip 21 is connected to the power interconnection 84D through a bonding wire 86. The semiconductor chip 21 and the bonding wire 86 are sealed on the mounting substrate 82 by sealing resin 87.

Then, the counter tester ground capacitance C11 of FIG. 20 can be estimated by performing parallel plate approximation based on an area of the semiconductor chip 21 and a distance d1 between the semiconductor chip 21 and the tester ground TGN. The counter tester ground capacitance C11 can be equally distributed to the respective nodes of the chip model 17 of FIG. 3.

Further, the counter tester ground capacitance C13 of FIG. 20 can be estimated by performing parallel plate approximation based on a value obtained by subtracting the area of the semiconductor chip 21 from the area of the semiconductor package 81 and a distance d2 between the semiconductor package 81 and the tester ground TGN. The counter tester ground capacitance C13 can be equally distributed to the respective nodes of the package model 18 of FIG. 3.

Alternatively, the counter tester ground capacitance C11 of FIG. 20 may be estimated by performing parallel plate approximation based on the area of the semiconductor chip 21, the distance d1 between the semiconductor chip 21 and the tester ground TGN, and a conductor area ratio of each power net.

Further, the counter tester ground capacitance C13 of FIG. 20 may be estimated by performing parallel plate approximation based on a value obtained by subtracting the area of the semiconductor chip 21 from the area of the semiconductor package 81, the distance d2 between the semiconductor package 81 and the tester ground TGN, and the conductor area ratio of each power net.

Figure 22A:
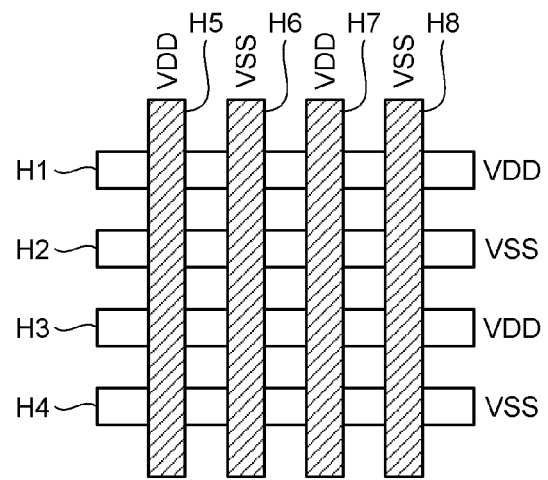
FIGS. 22A and 22B are plan views illustrating another example of a method of calculating a counter tester ground capacitance to be added to the chip model of FIG. 3.
Figure 22B:
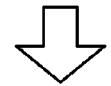
Figure 22B:
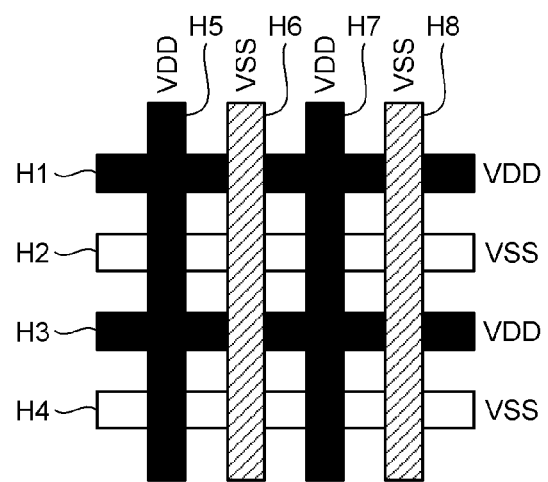

FIGS. 22A and 22B are plan views illustrating another example of a method of calculating a counter tester ground capacitance to be added to the chip model of FIG. 3.

Referring to FIG. 22A, power interconnections H1 to H4 are formed on a first layer of the semiconductor chip, and power interconnections H5 to H8 are formed on a second layer. Here, the power interconnections H1, H3, H5, and H7 are set to VDD potential, and the power interconnection H2, H4, H6, and H8 are set to VSS potential. For this reason, the power interconnections H1, H3, H5, and H7 belong to a power net different from the power interconnections H2, H4, H6, and H8.

For example, when counter tester ground capacitances of the power interconnections H1, H3, H5, and H7 are estimated, the power interconnections H1, H3, H5, and H7 are projected on the tester ground TGN as illustrated in FIG. 22B. Further, the counter tester ground capacitance C11 of FIG. 20 may be estimated by performing parallel plate approximation based on a projection area when the power interconnections H1, H3, H5, and H7 are projected on the tester ground TGN and the distance between the power interconnections H1, H3, H5, and H7 and the tester ground TGN.

Here, with respect to the IO portion 23 of FIG. 6, a projection area when the power interconnection is projected on the tester ground TGN may be constructed in the form of a library for each power net. The projection area may be obtained by performing a layer calculation process on the GDS. Further, with respect to the core portion 22 of FIG. 6, the projection area on the tester ground TGN may be obtained based on the power interconnection information.

Figure 23:
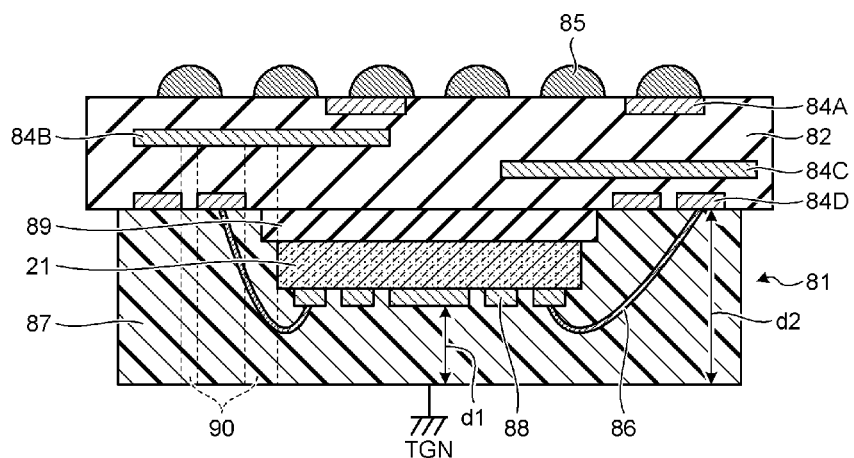
FIG. 23 is a cross-sectional diagram illustrating another example of a method of calculating a counter tester ground capacitance to be added to the package model of FIG. 4.

FIG. 23 is a cross-sectional diagram illustrating another example of a method of calculating a counter tester ground capacitance to be added to the package model of FIG. 4.

Referring to FIG. 23, for example, when the counter tester ground capacitance C13 of the ground plane 84B is estimated, the ground plane 84B is projected on the tester ground TGN. At this time, when a conductor is interposed between the ground plane 84B and the tester ground TGN, a projection image 90 of the ground plane 84B may be blocked by the conductor portion. Further, parallel plate approximation may be performed based on the projection area of the projection image 90 and the distance between the ground plane 84B and the tester ground TGN.

Figure 24:
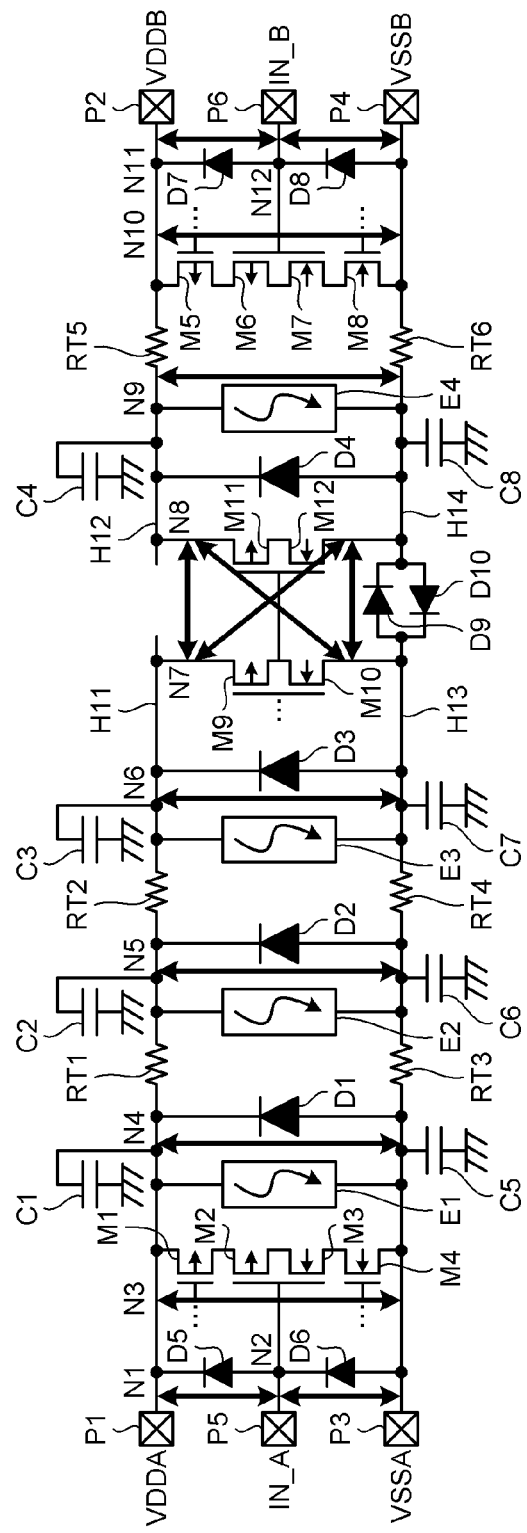
FIG. 24 is a diagram illustrating an example of an equivalent circuit generated based on the CDM analysis netlist according to an embodiment.

FIG. 24 is a diagram illustrating an example of an equivalent circuit generated based on the CDM analysis netlist according to an embodiment.

Referring to FIG. 24, the equivalent circuit is provided with power interconnections H11 to H14. The power interconnections H11 to H14 may belong to different power nets from one another. The power interconnection H11 is connected to a power pad P1, the power interconnection H12 is connected to a power pad P2, the power interconnection H13 is connected to a power pad P3, and the power interconnection H14 is connected to a power pad P4. Further, power resistors RT1 and RT2 are arranged on the power interconnection H11 in a distributed manner, a power resistor RT5 is arranged on the power interconnection H12, power resistors RT3 and RT4 are arranged on the power interconnection H13 in a distributed manner, and a power resistor RT6 is arranged on the power interconnection H14. Further, counter tester ground capacitors C1 to C3 are arranged on the power interconnection H11 in a distributed manner, a counter tester ground capacitor C4 is arranged on the power interconnection H12, the counter tester ground capacitors C5 to C7 are arranged on the power interconnection H13 in a distributed manner, and a counter tester ground capacitor C8 is arranged on the power interconnection H14.

Further, diodes D5 and D6 are serially connected to each other. One terminal of the series circuit is connected to the power pad P1, the other terminal of the series circuit is connected to the power pad P3, the connection point between the diodes D5 and D6 is connected to a signal pad P5. Field effect transistors M1 to M4 are serially connected to one another. One terminal of the series circuit is connected to the power pad P1, the other terminal of the series circuit is connected to the power pad P3, gates of the field effect transistors M2 and M3 are connected to the signal pad P5.

Further, diodes D7 and D8 are serially connected to each other. One terminal of the series circuit is connected to the power pad P2, the other terminal of the series circuit is connected to the power pad P4, and a connection point between the diodes D7 and D8 is connected to a signal pad P6. Field effect transistors M5 to M8 are serially connected to one another. One terminal of the series circuit is connected to the power pad P2, the other terminal of the series circuit is connected to the power pad P4, and gates of the field effect transistors M6 and M7 are connected to the signal pad P6.

Further, electrostatic protection elements E1 to E4 are connected to the diodes D1 to D4 in parallel, respectively. Field effect transistors M9 and M10 are serially connected to each other, and field effect transistors M11 and M12 are serially connected to each other. A connection point between the field effect transistors M9 and M10 is connected to gates of the field effect transistors M11 and M12. Further, diodes D9 and D10 are connected to each other in reverse parallel. The reverse parallel circuit of the diodes D9 and D10 is connected between power interconnections H13 and H14. The parallel circuits of the electrostatic protection elements E1 to E3 and the diodes D1 to D3 are connected between the power interconnections H11 and H13, and the parallel circuit of the electrostatic protection element E4 and the diode D4 is connected between the power interconnections H12 and H14. The series circuit of the field effect transistors M9 and M10 is connected between the power interconnections H11 and H13, and the series circuit of the field effect transistors M11 and M12 is connected between the power interconnections H12 and H14. Further, nodes N1 to N12 are arranged in the equivalent circuit in a distributed manner.

Figure 25A:
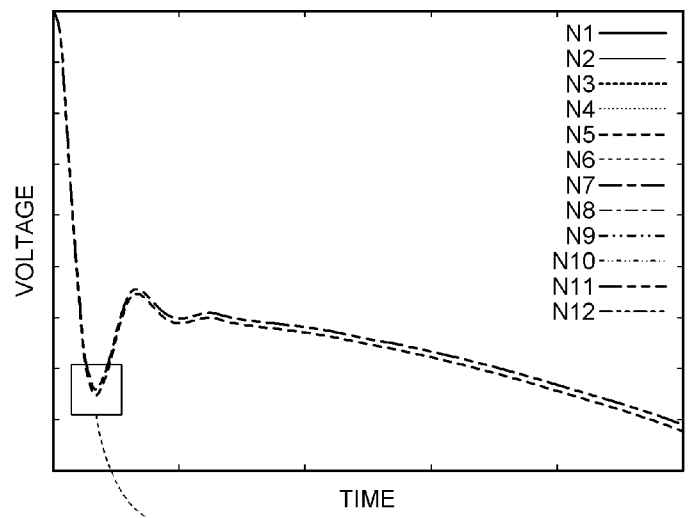
FIG. 25A is a diagram illustrating voltage waveforms of nodes of FIG. 24.
Figure 25B:
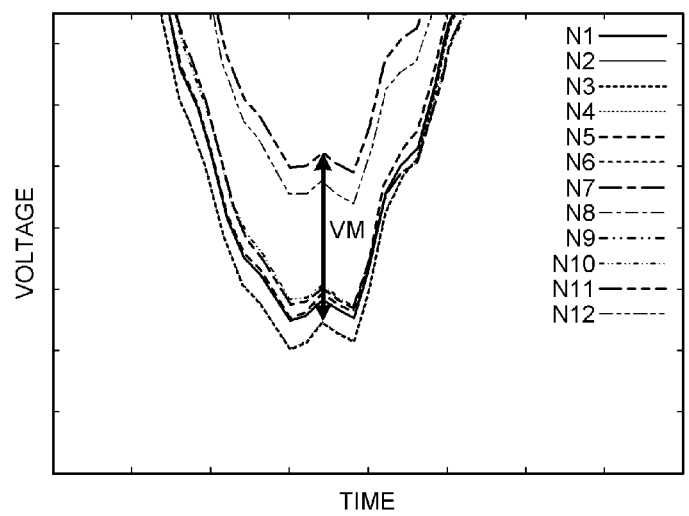
FIG. 25B is an enlarged diagram of a part of the voltage waveforms of FIG. 25A.

FIG. 25A is a diagram illustrating voltage waveforms of the nodes of FIG. 24, and FIG. 25B is an enlarged diagram of a part of the voltage waveforms of FIG. 25A.

Referring to FIGS. 25A and 25B, as the switch SW of the tester model 19 of FIG. 5A is turned on, the transient current I flows through the equivalent circuit of FIG. 24. At this time, the CDM tolerance of the semiconductor chip can be evaluated by calculating a maximum potential difference VM among the nodes N1 to N12 and comparing the maximum potential difference VM with a threshold value.

Figure 26:
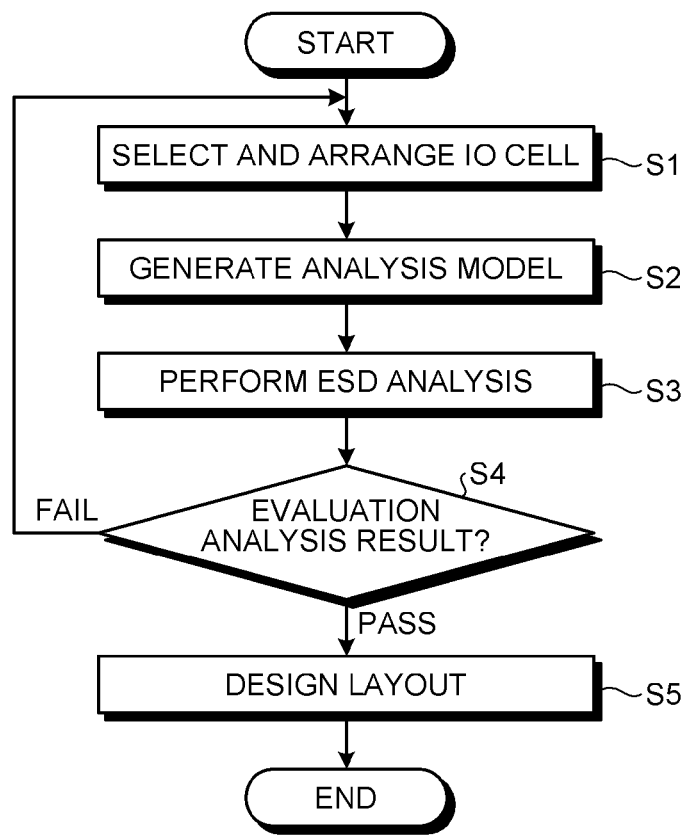
FIG. 26 is a flowchart illustrating a flow of ESD analysis and layout design according to an embodiment.

FIG. 26 is a flowchart illustrating the flow of ESD analysis and layout design according to an embodiment.

Referring to FIG. 26, the IO cells 1 to 3 to be arranged in the IO portion 23 of FIG. 6 are selected and then arranged in the IO portion 23 (S1). Next, an analysis model is generated based on the chip model 17, the package model 18, and the tester model 19 of FIG. 2 (S2). Next, ESD analysis is performed by performing the transient analysis of the equivalent circuit generated based on the analysis model (S3). The CDM tolerance of the semiconductor chip is evaluated by comparing the maximum potential difference between the nodes in the transient analysis with the threshold value. When the CDM tolerance evaluation is failed, a kind and an arrangement position of the IO cells 1 to 3 to be selected are changed until the evaluation of the CDM tolerance evaluation is passed. When the CDM tolerance evaluation is passed, the layout of the semiconductor chip is designed.

Here, by generating the analysis model based on the chip model 17, the package model 18, and the tester model 19 of FIG. 2, the CDM tolerance can be evaluated without designing the layout of the semiconductor chip, and design efficiency can be improved compared to layout-based ESD analysis. Further, the amount of data can be reduced compared to the layout-based ESD analysis, and analysis efficiency can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ESD analysis apparatus, comprising:
a chip model generating unit that generates a chip model based on an ESD protection circuit network model to which an inter power net capacitance of a semiconductor chip is added;
a package model generating unit that generates a package model based on an equivalent circuit model to which an inter power net capacitance of a semiconductor package including the semiconductor chip mounted therein is added;
a counter tester ground capacitance adding unit that adds a counter tester ground capacitance to the chip model and the package model;
a CDM analysis netlist generating unit that generates a CDM analysis netlist based on a connection relation between the chip model, the package model, and a tester model;
a transient analysis unit that performs transient analysis of an equivalent circuit generated based on the CDM analysis netlist; and
a maximum potential difference output unit that outputs a maximum potential difference between nodes disposed in the equivalent circuit in the transient analysis,
wherein the chip model generating unit includes
a core portion modeling unit that models a core portion of the semiconductor chip by a resistive network,
an IO portion modeling unit that generates the ESD protection circuit network model based on a connection state between an electrostatic protection element of the IO portion of the semiconductor chip and the resistive network, and
a first inter power net capacitance adding unit that adds an inter power net capacitance of the core portion to the resistive network and adds an inter power net capacitance of the IO portion to the ESD protection circuit network model, and
the package model generating unit includes
an RL modeling unit that models an interconnection of the semiconductor package by a connection relation between a resistor and an inductor, and
a second inter power net capacitance adding unit that adds the inter power net capacitance of the semiconductor package between power nets described by the connection relation between the resistor and the inductor.

2. An ESD analysis apparatus, comprising:
a chip model generating unit that generates a chip model based on an ESD protection circuit network model to which an inter power net capacitance of a semiconductor chip is added; a package model generating unit that generates a package model based on an equivalent circuit model to which an inter power net capacitance of a semiconductor package including the semiconductor chip mounted therein is added;
a first counter tester ground capacitance adding unit that adds a counter tester ground capacitance to the chip model a second counter tester ground capacitance adding unit that adds a counter tester ground capacitance to the package model;
a CDM analysis netlist generating unit that generates a CDM analysis netlist based on a connection relation between the chip model, the package model, and a tester model;
a transient analysis unit that performs transient analysis of an equivalent circuit generated based on the CDM analysis netlist;

a maximum potential difference output unit that outputs a maximum potential difference between nodes disposed in the equivalent circuit in the transient analysis, wherein the chip model generating unit includes a core portion modeling unit that models a core portion of the semiconductor chip by a resistive network, an IO portion modeling unit that generates the ESD protection circuit network model based on a connection relation between an electrostatic protection element of the IO portion of the semiconductor chip and the resistive network, and a first inter power net capacitance adding unit that adds an inter power net capacitance of the core portion to the resistive network and adds an inter power net capacitance of the IO portion to the ESD protection circuit network model.

3. The ESD analysis apparatus according to claim 2, wherein the core portion modeling unit generates the resistive network by arranging a grid in the core portion and obtaining combined resistance for each unit grid based on power interconnection information.

4. The ESD analysis apparatus according to claim 3, wherein the power interconnection information includes a power interconnection pitch, a power interconnection width, and a power interconnection direction.

5. The ESD analysis apparatus according to claims 2, wherein the inter power net capacitance of the core portion includes a well capacitance, a decoupling capacitance, a power interconnection capacitance, and a non-switching cell capacitance of the core portion.

6. The ESD analysis apparatus according to claims 2, wherein a connection relation between an electrostatic protection element of the IO portion and the resistive network and the inter power net capacitance is constructed in a form of a library for each IO cell.

7. The ESD analysis apparatus according to claim 2, wherein the package model generating unit includes an RL modeling unit that models an interconnection of the semiconductor package by a connection relation between a resistor and an inductor, and a second inter power net capacitance adding unit that adds the inter power net capacitance of the semiconductor package between power nets described by the connection relation between the resistor and the inductor.

8. The ESD analysis apparatus according to claim 7, wherein the RL modeling unit divides the interconnection of the semiconductor package into a signal interconnection and a power interconnection of the semiconductor package and models the interconnection of the semiconductor package.

9. The ESD analysis apparatus according to claim 8, wherein the RL modeling unit divides the interconnection of the semiconductor package into a bonding wire and a substrate interconnection of the semiconductor package and models the interconnection of the semiconductor package.

10. The ESD analysis apparatus according to claim 9, wherein the RL modeling unit estimates a signal wire length based on a distance between a signal pad and bonding finger, and then estimates RL of the a signal wire based on RL of the signal wire per unit length and the signal wire length, the RL modeling unit estimates a substrate interconnection length based on a distance between the bonding finger and a protruding electrode, and then estimates RL of the substrate interconnection based on RL of a substrate interconnection per unit length and the substrate interconnection length, the RL modeling unit estimates a power wire length based on a distance between a power pad and a power source ring, and then estimates RL of a power wire based on RL of the power wire per unit length and the power wire length, and the RL modeling unit estimates RL of a power source plane based on the shape of the power source plane.

11. The ESD analysis apparatus according to claim 7, wherein the second inter power net capacitance adding unit estimates an inter power net capacitance of the semiconductor package based on an overlapping area between power source planes of different power nets and an interlayer distance.

12. The ESD analysis apparatus according to claims 2, wherein the first counter tester ground capacitance adding unit estimates the counter tester ground capacitance by performing parallel plate approximation based on an area of the semiconductor chip and a distance between the semiconductor chip and a tester ground.

13. The ESD analysis apparatus according to claim 2, wherein the first counter tester ground capacitance adding unit estimates the counter tester ground capacitance by performing parallel plate approximation based on an area of the semiconductor chip, a distance between the semiconductor chip and a tester ground, and a conductor area ratio of each power net.

14. The ESD analysis apparatus according to claims 2, wherein the first counter tester ground capacitance adding unit estimates the counter tester ground capacitance by performing parallel plate approximation based on a projection area when a power interconnection of each power net of the semiconductor chip is projected on a tester ground and a distance between the power interconnection and the tester ground.

15. The ESD analysis apparatus according to claims 2, wherein the second counter tester ground capacitance adding unit estimates the counter tester ground capacitance by performing parallel plate approximation based on a value obtained by subtracting an area of the semiconductor chip from an area of the semiconductor package and a distance between the semiconductor package and a tester ground.

16. The ESD analysis apparatus according to claims 2, wherein the second counter tester ground capacitance adding unit estimates the counter tester ground capacitance by performing parallel plate approximation based on a value obtained by subtracting an area of the semiconductor chip from an area of the semiconductor package, a distance between the semiconductor package and a tester ground, and a conductor area ratio of each power net.

17. The ESD analysis apparatus according to claims 2, wherein the second counter tester ground capacitance adding unit estimates the counter tester ground capacitance by performing parallel plate approximation based on a projection area when a power interconnection of each power net of the semiconductor package is projected on a tester ground and a distance between the power interconnection and the tester ground.

* * * * *